July 7, 1970 F. W. PARRISH 3,519,888

HIGH VOLTAGE STACK HAVING METALLIC ENCLOSURE

Filed Aug. 12, 1968 3 Sheets-Sheet 1

INVENTOR
FRANK W. PARRISH
BY
OSTROLENK, FABER, GERB & SOFFEN
ATTORNEYS

July 7, 1970 F. W. PARRISH 3,519,888

HIGH VOLTAGE STACK HAVING METALLIC ENCLOSURE

Filed Aug. 12, 1968 3 Sheets-Sheet 2

INVENTOR.
FRANK W. PARRISH

BY

OSTROLENK, FABER, GERB & SOFFEN

ATTORNEYS

INVENTOR.
FRANK W. PARRISH

BY

OSTROLENK, FABER, GERB & SOFFEN
ATTORNEYS

United States Patent Office 3,519,888
Patented July 7, 1970

3,519,888

HIGH VOLTAGE STACK HAVING METALLIC ENCLOSURE

Frank W. Parrish, El Segundo, Calif., assignor to International Rectifier Corporation, Los Angeles, Calif., a corporation of California Filed Aug. 12, 1968, Ser. No. 751,817
Int. Cl. H01l 1/12
U.S. Cl. 317—100 6 Claims

ABSTRACT OF THE DISCLOSURE

A high voltage stack is contained within a hollow metallic enclosure having a polygonal cross-sectional shape. A plurality of semiconductor devices are connected to the interior walls of the metallic enclosure with beryllia ceramic disc interposed between the metallic surface of the enclosure and one surface of each of the semiconductor devices. The semiconductor devices are then connected in series with one another and are arranged in a helical path. The first and last of the semiconductor devices have their terminals connected to first and second end caps which enclose the top and bottom, respectively, of the polygonal housing, and the entire housing is filled with a suitable dielectric potting compound.

This invention relates to semiconductor device assemblies composed of a plurality of individual semiconductor devices interconnected with one another, and more particularly relates to a novel housing structure for a high voltage rectifier stack which consists of a hollow metallic body having series connected diodes mounted on the interior wall thereof.

The formation of high voltage stacks from a plurality of series connected semiconductor diodes is well known. For example, copending application, of the common assignee, Ser. No. 633,969, filed Apr. 26, 1967, now issued as Pat. No. 3,422,340, entitled High Voltage Rectifier Stack Assembly Having Centrally Supported Capacitor, in the name of John Richmond et al., illustrates a typical high voltage stack module which consists of a plurality of semiconductor diodes mounted on a tubular insulation sheath with the diodes forming a helical pattern around the sheath. Another typical high voltage stack is shown in U.S. Pat. 3,184,646, in the name of Diebold.

In accordance with the present invention, the hollow mounting body for carrying the semiconductor devices is of a metallic material, such as aluminum or copper, with the individual diodes mounted on the body through the intermediary of an electrical insulation disc which has a good heat conduction properties. Such discs are well known to the art and may be a beryllia ceramic. Each of the devices is then connected to one another internally of the conductive housing to form a series circuit. The use of the metallic housing, rather than the insulation housing used in the prior art, provides substantially improved heat transfer characteristics to ambient from the metallic housing and provides extremely effective shielding of the individual semiconductor devices. Moreover, the use of a metallic housing provides improved thermal coupling between the individual devices and the metallic support which serves as a high voltage shield and heat exchanger, thereby permitting a higher power rating for the assembly as compared to a similar structure using an insulation support housing. The individual semiconductor devices may of course be of any desired type such as diodes, thyristors and the like. For purposes of illustration, the invention is described herein with reference to diodes.

After assembly of the individual diodes within the metallic housing, the housing interior may be filled with a suitable epoxy or silastic medium, and insulation end caps may then be applied to the opposite ends of the stack. Each of the insulation end caps may have metallic terminal inserts which are connected to the first and last of the series connected diodes in the stack. In addition, the terminal inserts may have a threaded stud for one end cap and a tapped metallic body for the other end cap, thereby permitting the assembly of a plurality of stacks by merely threading the stud of one stack into the threaded opening of an adjacent stack.

Accordingly, a primary object of this invention is to increase the power rating of a semiconductor device assembly by using a metallic enclosure for receiving the semiconductor devices within the stack.

A further object of this invention is to provide a novel high voltage stack which is inexpensive and has extremely effective shielding.

A further object of this invention is to improve the thermal coupling between diodes of a high voltage stack.

These and other objects of this invention will become apparent from the following descriptions taken in connection with the drawings in which.

Figures 1, 2, 3:
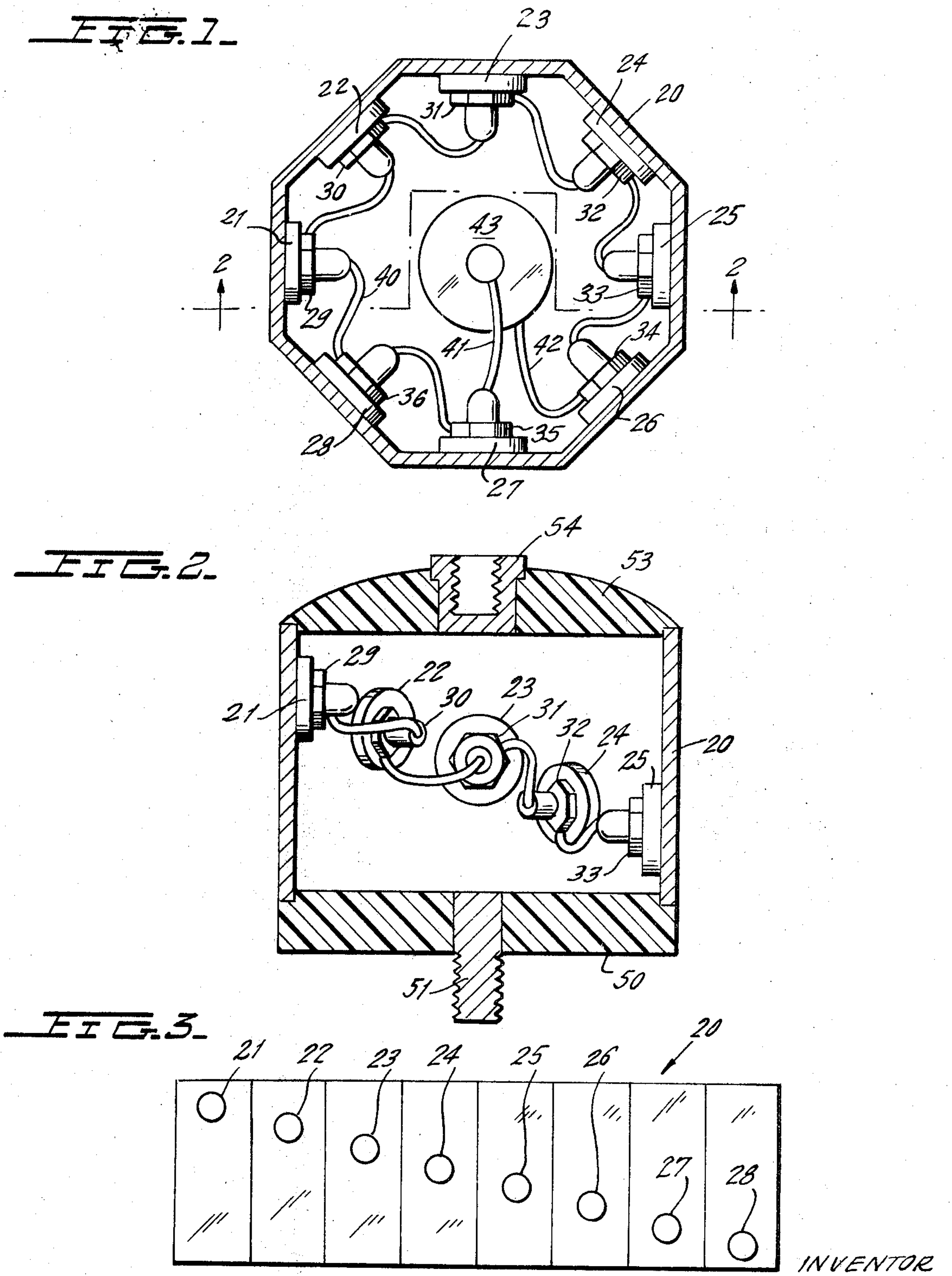
FIG. 1 is a cross-sectional view taken perpendicular to the axis of the high voltage stack of the present invention.
FIG. 2 is a cross-sectional view of FIG. 1, taken across the section line 2—2 in FIG. 1.
FIG. 3 shows an interior view of the housing walls for the metallic housing of FIGS. 1 and 2 with the housing walls unfolded to a flat condition to illustrate the sequential placement of the individual diodes in order to define a helical path within the housing.

Referring first to FIGS. 1 and 3, in accordance with the invention a hollow metallic tube 20, which may be of aluminum and extruded to any desired form such as the polygonal form illustrated, is used as the main housing portion for a high voltage rectifier stack. Hollow extruded tube 20 may have a wall thickness of about ¼ inch and a diameter of about 4 inches, although these dimensions will vary depending upon the particular application. The height of tube 20 may be approximately 3½ inches, although again this height can be varied as desired.

A plurality of heat-conductive, electrically-insulating, ceramic discs are then secured to the flat wall portions of enclosure 20 in the pattern shown in FIG. 3, with the discs defining a helical path within the enclosure. The ceramic discs may be "cold soldered" to the walls, as will be described hereinafter, or may be electrically plated on their opposite flat surfaces with one of the plated surfaces soldered to the respective wall portion to which the corresponding surface is attached.

The discs are shown in FIGS. 1, 2 and 3 as ceramic discs 21 to 28 having, for example, a diameter of about ¾ of an inch and a thickness of about 1⁄32 of an inch. A standard stud mounted diode is then modified by cutting the threaded stud from the bottom thereof so that the diode has a flat bottom surface. Light diodes 29 to 36, prepared in this manner, are then soldered to the interior-facing surfaces of discs 21 to 28, respectively, as shown in FIGS. 1 and 2.

The pigtail-type leads of each diodes 29 to 36 are then interconnected, as shown in FIGS. 1 and 2, whereby the pigtail lead of each diode is connected to the hexagonal base electrode of the next diode. Thus, pigtail lead 40 of diode 29 is connected to the conductive base portion of diode 36. This connection may be made by soldering the end of the pigtail lead 40 to either the conductive base of diode 36 or to the upper plated surface of ceramic wafer 28.

Each of the diodes are connected in this manner to form a series connection of diodes which terminates with the pigtail lead 41 of diode 35 and with the lead 42 extending from the base of diode 34. These leads may then be connected to the top and bottom terminals of a central capacitor 43 which may serve as a capacitor connected across the entire series string of diodes.

After making all internal connections, the interior of housing 20 is closed at the bottom by insulation end cap 50 and the container is then filled with a suitable dielectric potting compound such as an epoxy resin. The potting compound helps to mechanically support the leads within the enclosure, and, of course, provides increased dielectric strength between the various components.

A threaded metallic stud 51 is carried in the center of end cap 50 and serves as the end terminal for the stack and has lead 42, or a lead extending from the bottom of capacitor 43, connected thereto. The top of the stack is then closed by a suitable top cap 53 which has a threaded metallic insert 54 therein, dimensioned to threadably receive a threaded stud such as stud 51 of an adjacent high voltage stack.

In the embodiments shown in FIGS. 1, 2 and 3, eight series connected diodes have been illustrated. Obviously, any desired number of diodes could be connected in series within the metallic enclosure 20 with the diodes following a helical path. Moreover, the diodes could be connected in any desired circuit pattern such as parallel connections between groups of diodes and series connection of the parallel groups.

Figure 4:
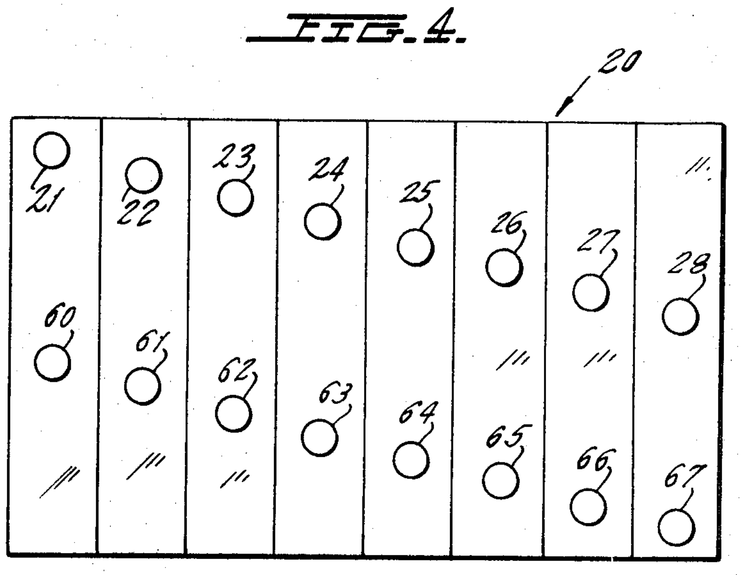
FIG. 4 is a view similar to FIG. 3 illustrating how the housing may be made longer in order to accommodate a second helical coil of semiconductor devices.

Housing 20 may be formed in the manner shown in FIG. 4 where two convolutions of diodes would be carried on the two convolutions of insulation discs 21 to 28 and 60 to 67. That is, as compared to FIG. 3, discs 60 and 67 of FIG. 4 provide a second convolution or turn for the helical arrangement of diodes within the metallic housing 20.

Figure 5:
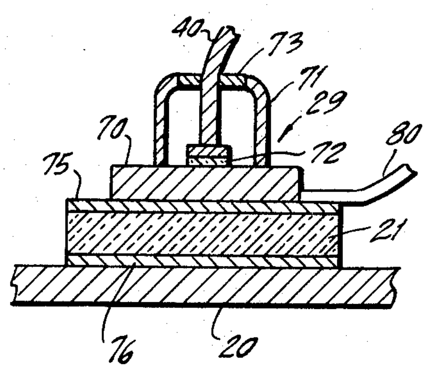
FIG. 5 shows a cross-sectional view of a first type of semiconductor diode which can be mounted on the walls of the device of FIGS. 1 to 4 wherein the device is of the stud-mounted type with the threaded stud removed therefrom.

FIG. 5 illustrates, in detail, one manner in which one of the diodes 29 to 36, and specifically diode 29 is fastened to the interior surface of enclosure 20. Diode 29 is of a standard type contained within a stud housing and includes a hexagonal base portion 70 and a metallic housing 71 which encloses a semiconductor wafer 72 having a rectifying junction therein. Semiconductor wafer 72 has one surface seated upon the hexagonal base 70 and its opposite surface connected to the pigtail conductor 40 which enters housing 71 through a suitable insulation bead 73. Ceramic disc 21 is shown in FIG. 5 as having conductive surfaces 75 and 76 plated thereon which permit the soldering or brazing of wafer 21 to the conductive enclosure 20 and to the bottom surface of hexagonal base 70 which has had the threaded stud extending from its bottom, removed.

FIG. 5 illustrates that the lead 80 of the adjacent diode 31, as shown in FIG. 1, can also be soldered or brazed to the conductive coating 75. If desired, lead 80 can be directly secured to base 70.

The ceramic wafer 21 may be soldered directly to the enclosure 20 and to the conductive hexagonal base 70 by a cold soldering process which avoids the need for plating wafer 21 with conductive surfaces 75 and 65. A satisfactory cold solder process is described in technical report number STR-2583 dated December 1960, published by the United States Department of Commerce, National Bureau of Standards. With this process, non-metallized ceramic discs are cold soldered to other materials by a medium similar to a dental amalgam. For example, a suitable gallium alloy can be used for low temperature bonding where the gallium alloy is made by dissolving powdered metals such as of copper, tin, gold, nickel, silver or cobalt in molten gallium. This alloy is then used as an adhesive and cured at a moderate temperature for from 2 to 48 hours, depending upon the alloy. An excellent bond is made with this process which has excellent thermal conductivity characteristics. Moreover, such bonds have been found to withstand temperatures of up to 900° C. without deterioration. Obviously, a combination of the cold soldering technique for one surface of wafer 21 and the direct soldering or brazing of the opposite surface which has been metallized could also be used in securing the ceramic wafers between the metallic enclosure and the diode to be connected thereto.

Figure 6:
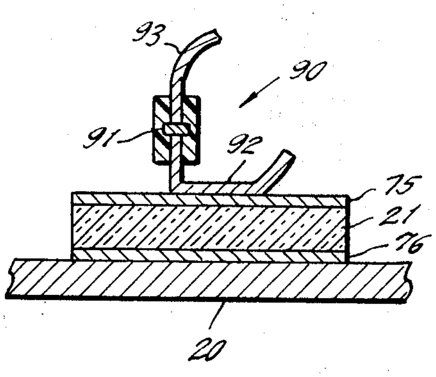
FIG. 6 is a view similar to FIG. 5 in which the rectifying device is an encapsulated diode having axial leads.

FIG. 6 shows another type of diode which could be used within the enclosure of FIGS. 1 and 2 where the diode 90 consists of a semiconductor wafer 91 captured between the ends of axial leads 92 and 93 with the diode 91 encaspulated in a suitable encapsulating compound. Lead 92 is then suitably soldered to metallized coating 75 of wafer 21 or, alternatively, lead 92 could be cold soldered to be the bare upper surface of wafer 21, as described previously.

Figure 7:
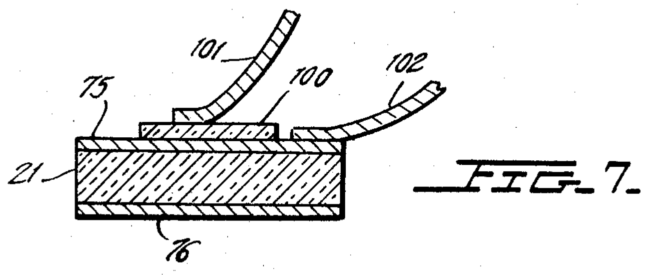
FIG. 7 illustrates the use of a bare wafer having a rectifying junction therein which could be used as the diode element shown in FIGS. 1 and 2.

FIG. 7 shows a still further type of diode which could be used for the individual diodes of FIGS. 1 and 2 wherein a bare semiconductor wafer 100 is placed directly on top of and soldered to metallized coating 75 of ceramic wafer 21. Wafer 100 contains a suitable rectifying junction. A lead 101 is then connected directly to the upper surface of wafer 100 while the lead from an adjacent device may be soldered to coating 75, and is illustrated as lead 102. The use of bare semiconductor wafers within the enclosure 20 is permissible when the enclosure is subsequently filled with an encapsulating medium which will, in effect, passivate the junction of wafer 100.

Figure 8:
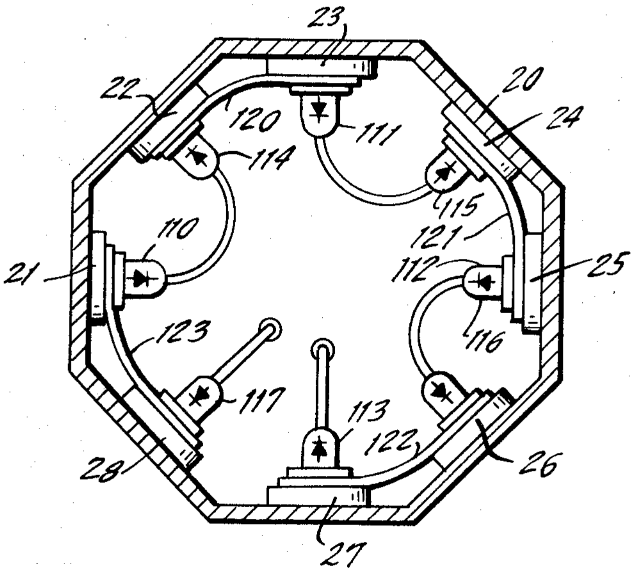
FIG. 8 is a cross-sectional view similar to FIG. 1 wherein the diode devices are of alternately different polarity type in order to simplify the connection of the devices within the thermally conductive enclosure.

FIG. 8 shows a modification of the arrangement of FIG. 1 wherein the adjacent diodes are made of opposite polarity types, thereby simplifying the series connection of the diodes. Thus, in FIG. 8, each of diodes 110 to 113 are of the standard polarity type where the diodes are stud mounted diodes identical to diodes 29, 31, 33 and 35, respectively in FIG. 1. The alternate diodes 114 to 117 are reverse polarity diodes, as indicated by the rectifier marking in FIG. 8. This permits a simplified connection between diodes which includes conductive straps 120 to 123 which extend between the upper surfaces of adjacent ceramic wafers, while the upper leads of each of the devices are connected directly together as illustrated. The upper leads of diodes 113 and 117 then serve as the output leads for the series connected rectifier stack of FIG. 8.

Figure 9:
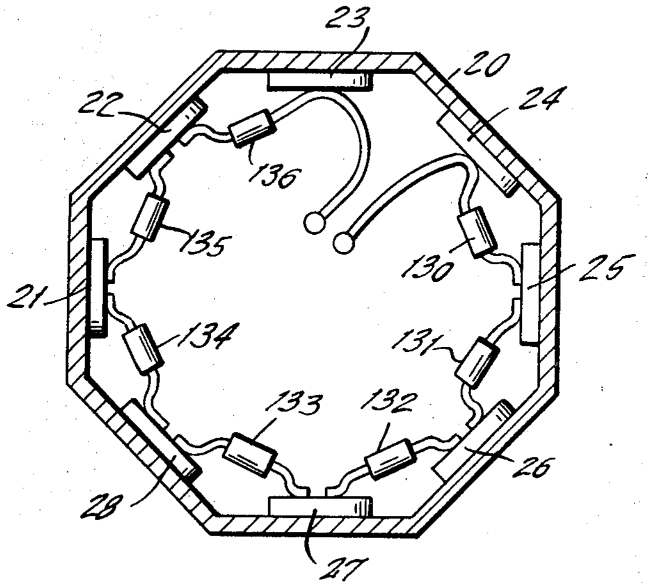
FIG. 9 is similar to FIG. 8 and illustrates the manner in which encapsulated diodes having axial leads may be mounted within the metallic enclosure.

FIG. 9 shows a still further modification of the arrangement of FIG. 1 where, instead of the stud mounted type diodes of FIGS. 1 and 8, an axial lead, encapsulated diode is used instead. Such devices were described in connection with FIG. 6. In FIG. 9, the leads of the various series connected diodes 130 to 136 are secured to the upper surface of the ceramic wafers 21 to 28, with the adjacent leads of devices 130 and 136 serving as the output terminals for the series connected stack of diodes. Note that the soldering of the various diode leads to the ceramic discs may be performed by soldering to a metallized surface of the ceramic discs or by the cold soldering process previously described.

Although the invention has been described above with respect to its preferred embodiments, it will be understood that many variations and modifications will be obvious to those skilled in the art. It is preferred, therefore, that the scope of the invention be limited not by the specific disclosure herein, but only by the appended claims.

I claim:

1. A semiconductor device assembly comprising, in combination: a plurality of series-connected semiconductor devices having first and second electrodes; a respective heat conductive and electrically insulative ceramic disc for each of said semiconductor devices; and an elongated metallic body; each of said ceramic discs having one surface secured to one surface of said elongated metallic body; said ceramic discs being spaced from one another along a predetermined path along said one surface of said metallic body; each of said semiconductor devices having one of their said first and second electrodes connected to the surface of their said respective ceramic discs which is opposite said one surface of said disc, the other of said first and second electrodes of each of said semiconductor devices connected to the other of said first and second electrodes of one of said semiconductor devices adjacent thereto along said predetermined path, whereby said series-connected semiconductor devices electrically connected to one another are thermally connected but electrically insulated from said elongated metallic body; said elongated metallic body comprising a hollow tube; said first surface of said elongated metallic body comprising the interior surface of said tube; said predetermined path comprising a helix.

2. The assembly claim 1 wherein said plurality of semiconductor devices are diodes.

3. The assembly of claim 1 which includes first and second end caps of insulation material enclosing the opposite ends respectively of said housing; each of said first and second end caps having metallic terminal bodies; and one of said first and second electrodes of each of an adjacent pair of said semiconductor devices being connected to said metallic terminal bodies in said first and second end caps, respectively.

4. The assembly of claim 1 wherein said hollow tube is filled with an encapsulating compound.

5. The assembly of claim 1 wherein said hollow tube has a polygonal cross-section and each of said discs is mounted on a respective flat of said polygon.

6. The assembly of claim 4 wherein said hollow tube has a polygonal cross-section, each of said discs is mounted on a respective flat of said polygon, and said predetermined path is helical.

References Cited

UNITED STATES PATENTS

| | | | |
|---|---|---|---|
| 2,453,435 | 11/1948 | Havstad | 174—50.6 X |
| 3,018,424 | 1/1962 | Colaiaco | 317—100 X |
| 3,021,461 | 2/1962 | Oakes et al. | 317—234 |
| 3,361,868 | 1/1968 | Bachman | 317—234 |
| 3,366,171 | 1/1968 | Scharli | 317—100 X |
| 3,428,871 | 2/1969 | Scott et al. | 317—234 |

LARAMIE E. ASKIN, Primary Examiner

G. P. TOLIN, Assistant Examiner

U.S. Cl. X.R.

317—234; 174—16